(12) United States Patent
Peters (10) Patent No.: US 11,619,325 B2
(45) Date of Patent: Apr. 4, 2023

(54) MULTIFUNCTIONAL CLAMPING DEVICE

(71) Applicant: MULTIPOND Wägetechnik GmbH, Waldkraiburg (DE)

(72) Inventor: Andreas Peters, Aschau am Inn (DE)

(73) Assignee: MULTIPOND Wägetechnik GmbH, Waldkraiburg (DE)

( * ) Notice: Subject to any disclaimer, the term of this patent is extended or adjusted under 35 U.S.C. 154(b) by 0 days.

(21) Appl. No.: 17/307,056

(22) Filed: May 4, 2021

(65) Prior Publication Data
US 2021/0341081 A1   Nov. 4, 2021

(30) Foreign Application Priority Data

May 4, 2020   (EP) .................................... 20172686

(51) Int. Cl.
| | | |
|---|---|---|
| *F16L 3/08* | (2006.01) | |
| *F16L 3/00* | (2006.01) | |
| *F16L 3/12* | (2006.01) | |
| *F16L 3/237* | (2006.01) | |

(52) U.S. Cl.
CPC .............. *F16L 3/085* (2013.01); *F16L 3/006* (2013.01); *F16L 3/1222* (2013.01); *F16L 3/237* (2013.01)

(58) Field of Classification Search
CPC ......... F16L 3/222; F16L 3/006; F16L 3/1222; F16L 3/237; F16L 3/1025; H02G 3/32; F16B 7/0493
See application file for complete search history.

(56) References Cited

U.S. PATENT DOCUMENTS

| | | | | |
|---|---|---|---|---|
| 2,592,791 A | * | 4/1952 | Coberly ............... | F16L 3/2235 24/135 R |
| 3,856,244 A | * | 12/1974 | Menshen ............... | F16L 3/237 248/68.1 |
| 4,066,371 A | | 1/1978 | Chapman | |
| 4,167,355 A | | 9/1979 | Hansson | |
| 4,817,897 A | * | 4/1989 | Kreusel ..................... | F16B 7/04 248/74.1 |
| 5,025,780 A | * | 6/1991 | Farley .................... | A61B 90/50 600/230 |
| 5,792,046 A | * | 8/1998 | Dobrovolny ........... | A61B 17/02 403/374.1 |

(Continued)

FOREIGN PATENT DOCUMENTS

| | | |
|---|---|---|
| DE | 2757479 | 6/1978 |
| DE | 3237362 | 4/1984 |

(Continued)

*Primary Examiner* — Eret C McNicholas (57) ABSTRACT

The present invention includes a clamping device (1) for connecting clamping parts (K), wherein, by movement of a single tensioning element (4), both at least one clamping section (3) can be rotated relative to a connecting joint (2), or two clamping sections (3) can be rotated relative to one another, and, by clamping at least one clamping jaw (5), the clamping parts (K) can be clamped in the at least one clamping section (3). Thus, by moving a single tensioning element (4), both clamping and fixing and releasing rotation of the at least one clamping section (3) is possible. This clamping device (1) is easy to handle, highly variable, and also takes into account the regulations of hygienic design, since no gaps, cavities or threads are exposed here in which dirt could accumulate.

13 Claims, 10 Drawing Sheets

(56) References Cited

U.S. PATENT DOCUMENTS

| | | | | |
|---|---|---|---|---|
| 6,033,363 | A * | 3/2000 | Farley | A61B 90/57 600/234 |
| 6,234,372 | B1 * | 5/2001 | Rivera | B60R 9/10 224/535 |
| 6,386,786 | B1 * | 5/2002 | Perlman | F16L 3/085 403/374.2 |
| 6,435,565 | B2 * | 8/2002 | Potts | F16L 39/00 285/248 |
| 6,612,526 | B2 * | 9/2003 | Meuth | F16B 7/0433 248/230.8 |
| 7,241,071 | B2 * | 7/2007 | Carraher | E04C 5/163 52/719 |
| 7,401,753 | B2 * | 7/2008 | Bozmoski | F16L 39/00 248/316.1 |
| 7,556,229 | B2 * | 7/2009 | Elliott | F16B 37/0857 248/292.12 |
| 7,562,855 | B2 * | 7/2009 | Oetlinger | F16B 7/0493 600/234 |
| 7,938,829 | B2 * | 5/2011 | Mullaney | F16B 2/10 403/385 |
| D709,979 | S * | 7/2014 | Prieto | A61B 90/50 D22/108 |
| 9,574,384 | B1 * | 2/2017 | Reischmann | E05D 11/10 |
| 9,695,961 | B2 * | 7/2017 | Michelet | F16L 3/1222 |
| 9,829,019 | B2 * | 11/2017 | McFadden | F16B 5/0225 |
| 10,226,241 | B2 * | 3/2019 | Farley | F16B 2/18 |
| 10,968,929 | B2 * | 4/2021 | Liao | F16B 2/12 |
| 11,168,812 | B1 * | 11/2021 | Wedding | F16L 3/085 |
| 11,168,836 | B2 * | 11/2021 | Kelly | F16B 7/0493 |
| 2010/0005636 | A1 | 1/2010 | Liao et al. | |
| 2015/0260289 | A1 | 9/2015 | Peters | |

FOREIGN PATENT DOCUMENTS

| | | |
|---|---|---|
| DE | 3610564 | 10/1987 |
| DE | 4343676 | 6/1995 |
| DE | 202005012886 | 10/2005 |
| DE | 202005014988 | 12/2005 |
| DK | 1754893 | 6/2013 |
| EP | 0078589 | 5/1983 |
| EP | 1754893 | 2/2007 |
| EP | 3017225 | 1/2015 |
| EP | 2918855 | 9/2015 |
| FR | 940008 | 12/1948 |
| GB | 1194478 A * | 6/1970 |
| WO | WO 95/17610 | 6/1995 |
| WO | WO 2015/000485 | 1/2015 |

\* cited by examiner

MULTIFUNCTIONAL CLAMPING DEVICE

RELATED APPLICATION

This application claims the benefit of priority of European Patent Application No. 20 172 686.6 filed on May 4, 2020, the contents of which are incorporated herein by reference in their entirety.

FIELD AND BACKGROUND OF THE INVENTION

The present invention relates to a clamping device, with which components, such as pipes and rods, can be clamped and thus connected to each other or to a surface.

Such clamping devices are used in various areas, for example in the assembly of frames on plants, for stands in the laboratory area as well as for the fastening of plant components.

Particularly in the food industry and food processing industry, there are high requirements for the hygienic design of plants and plant components to ensure easy and safe cleaning. Plant components that are not designed in accordance with hygienic requirements can increase the risk of contamination by microorganisms of the entire plant, as well as promote the entry of contaminants.

For a hygienic design, it is therefore necessary that all plant components are not contaminated by an increase in the concentration of relevant microorganisms (biofilm), dirt, insects, other vermin or impurities, which often accumulate in recesses, crevices, slots, dead spaces or even exposed threads.

Plant components of plants in the food industry and food processing industry very often have clamp connections. Examples of this are operating units, for example touch operating units, or also various camera systems for monitoring a plant, which also serve in part to control the product flow. Various frame structures and tubes, such as stainless steel tubes, are usually used for fastening such components. Cross clamping devices are used as standard to connect the individual frame parts and fasten the individual components; parallel connectors are also possible.

In the prior art, for example, patent document EP 2 918 855 A1 is known, which discloses a cross clamping device with a sealing profile. This sealing profile is manufactured from a single piece and encloses a clamped part on both sides of the clamping device, thus sealing the gaps between the clamped part and the clamping device without gaps and also completely filling the clamping slot. This means that there are no crevices, grooves, other dead spaces or depressions in a connecting part, in particular a cross-clamping piece, in which condensed water, product residues or other impurities could accumulated, because all gaps and cavities are filled or sealed, and there are also no threads exposed, since these are enclosed by the continuous sealing profile.

Furthermore, document EP3017225A1 is known, which presents a clamp with multiple sealing elements. This system comprises a bracket for pipe profiles having a body with a center hole for enclosing a pipe profile in the center hole, the body having at least two non-elastic bracket parts with inner surfaces facing the center hole and outer surfaces. The retainer has a shape that provides a hygienically tight connection between the retainer and the tubular profile and provides mechanical support to the tubular profile. The holder can therefore be used in environments with high hygienic requirements, e.g. in the food industry.

In the prior art, document EP 0 078 589 A1 is further known, in which a part to be clamped is completely enclosed by a clamping section, whereby the clamping can be controlled via a screw contained in the clamping section.

Furthermore, document EP 1 754 893 A2 is known in the prior art, which discloses a clamping piece for clamping a rod-shaped component, whereby a clamping sleeve is slotted and has two clamping jaws which can be moved against each other via a clamping means. However, the clamping sleeve is enclosed on the outside by a closed, one-piece housing, so that hygiene regulations can be complied with and no threads are exposed and no slits, cavities or other depressions are created on the outside.

Document DE 20 2005 012 886 U1 further discloses a clamping piece which can accommodate a rod or similar component. Here, there are no clamping slots as well, rather there is a blind hole in the clamping section into which a screw is inserted, and this screw controls the clamping of the clamping jaws.

The disadvantage of the prior art systems is the complex design of the frame structures with the aim to fix components at a basic position or to be able to adjust them in a given range.

According to the prior art, an angle between at least two clamped components or at least one component to a surface in the prior art cannot be flexibly adjusted without first removing at least one clamped component, and furthermore, additional components such as housings or sealing profiles are necessary for the hygienic design.

It is therefore an object of the present invention to provide a variable clamping device for which the angle between at least two clamping parts or at least one part to a surface can be variably adjusted without prior removal of a clamping part, which is designed to be hygienic and which can be operated as easily as possible.

This object is solved by a clamping device, by a system, and by a use as described herein. Further advantageous embodiments of the invention are the subject-matter of the dependent claims.

SUMMARY OF THE INVENTION

The invention includes a clamping device with which clamping parts can be connected and clamped. This clamping device comprises a connecting joint, at least one clamping section, each having a transmission element, and a tensioning element.

The tensioning element is arranged on the connecting joint and has a first end position in a clamped state and a second end position in a relaxed state. In the clamped state, a respective transmission element presses against a clamping part, whereby the clamping part is clamped between the transmission element and a clamping section and is thus fixed.

In a relaxed state, a clamping part is movable in a clamping section, since a gap is created in the clamping section, the transmission element is no longer in contact with the clamping part, and the clamping part is thus movable.

In the relaxed state, the at least one clamping section can also be rotated relative to the connecting joint—in the case of two or more clamping sections, these can also be rotated relative to each other. Alternatively, the connecting joint can also be firmly and sealed to a surface on one side—thus a clamping section can then be rotated relative to the connecting joint.

In the clamped state, the at least one clamping section is fixed to the connecting joint—preferably by frictional locking—and thus cannot be rotated. However, the fixation of the rotational degree of freedom can only take place if a clamping part is guided through the clamping section.

Such a clamping device enables that by moving a single tensioning element, for example a screw, both the clamping of clamping parts in the at least one clamping section can be performed and an additional degree of freedom, namely the rotation of the at least one clamping section relative to the connecting joint and, in case of more than one clamping section, the rotating of the clamping sections against each other can be controlled.

Furthermore, all gaps, cavities and threads in this clamping device can be reliably sealed with suitable sealing elements, which is why dirt or food residues cannot accumulate anywhere in this clamping device. Such a clamping device therefore satisfies the regulations for a hygienic design of components or plant parts in the food industry or food processing industry.

Furthermore, this clamping device enables greater variability, so that the positioning and adjustment ranges can be enabled without additional components, i.e. an angle enclosing a clamping part with a mounting plane or two clamping parts can be variably set. Hence—in contrast to a cross clamping device—not only an angle of 90° between both clamping parts is possible, rather the angle range can be variably adjusted.

Preferably, the at least one transmission element is displaced in the direction of the end of the clamping section facing away from the connecting joint in the clamped state, so that a clamping part presses against the end of the at least one clamping section or clamping sections facing away from the connecting joint, whereby clamping parts can be fixed in the at least one clamping section. In the relaxed state, the at least one transmission element is displaced in the direction of the connecting joint, whereby a clamping part is movable in the at least one clamping section.

This embodiment allows for a simple and compact design and contributes to the hygienic design, since all components for creating a clamping effect are provided inside the connecting joint and it can be securely sealed.

Preferably, a clamping element is present in the connecting joint, which has an inclined surface on at least one side. This inclined surface in turn abuts an inclined surface of the at least one or respectively one transmission element. A translational movement of the clamping element thus causes a translational movement of the at least one transmission element and, and further preferably, the translational movement of the clamping element has a different direction than the translational movement of the at least one transmission element, and still further preferably both directions of movement are perpendicular to each other.

This embodiment of the clamping device allows the entire clamping mechanism to be provided inside the connecting joint, and by arranging the clamping element and the transmission element with the at least one clamping element and each transmission element abutting against each other on an inclined plane of one side, it is possible to provide the simplest and least expensive embodiment possible with few and simple components.

Further preferably, the tensioning element is a screw connected to the interior of the connecting joint and the clamping element by a thread, and thus the clamping element is movable along the thread by turning the screw. This allows a rotational movement of the tensioning element, i.e. the screw, to be transferred to a translational movement of the clamping element, which then in turn moves the at least one transmission element, and thus the rotation of the tensioning element can be transferred to the movement of the transmission element easily and efficiently.

Further preferably, a bushing is provided on at least one side of the connecting joint, which bushing has an annularly arranged projection. Furthermore, the at least one clamping section also has a projection which engages with the projection of the bushing, so that the at least one clamping section is held on the connecting joint on the one hand, but can be rotated on the other hand—at least in the relaxed state.

This embodiment with the bushing makes it very easy to assemble the clamping device, since the at least one clamping section can thus be attached to the connecting joint very easily.

Further preferably, in the relaxed state the projection of the at least one clamping section is positioned with clearance respectively between the connecting joint as well as the projections of the at least one bushing, and is rotatable relative to the connecting joint in the relaxed state. If two or more clamping sections are provided, they are rotatable relative to each other.

In the clamped state, the projection of the clamping section is then pressed against the respective projection of the bushing, so that the at least one clamping section is fixed to the projection of the at least one bushing by a frictional connection. Thus, the at least one clamping section is no longer rotatable relative to the connecting joint during intended use. If two or more clamping sections are provided, they are also no longer rotatable relative to each other during intended use. If the clamping section is subjected to a moment that exceeds the intended use, the clamping section is rotated in a similar way to an overload coupling in order to prevent damage to downstream components.

This particular embodiment makes it possible that by simply turning the tensioning element, i.e. by changing from the relaxed to the clamped state, both a movement of the at least one transmission element can be initiated, and a frictional connection between the at least one clamping section and the bushing can be set at the same time. Thus, the movement of the tensioning element also enables a specific adjustment of the state whether the at least one clamping section can be rotated relative to the connecting joint or the clamping sections can be rotated relative to each other or not.

Further preferably, a clamping jaw is attached to a respective transmission element, which is adapted to at least partially abut the circumferential surface of a clamping part.

A clamping jaw is particularly advantageous for round clamping parts. This means that no cavities can occur between the clamping jaw and the clamping part, this leads to a force-fit connection, and little installation space is required.

Preferably, the tensioning element is a screw whose head rests on the connecting joint and which is sealed against the connecting joint by means of a sealing disc pressed in a defined manner. This ensures that no thread is exposed, which is conducive to hygienic design, and also prevents foreign substances (e.g. liquid or dust) from entering the interior of the clamping device.

Preferably, furthermore, at least one sealing element is provided respectively between the at least one clamping section and the connecting joint, so that no foreign substances (e.g. liquid or dust) can enter the interior of the connecting joint or the at least one clamping section as well in this case.

Furthermore, a sealing element is preferably provided at the opening of the at least one clamping portion, which is adapted to conform to the outer surface of the at least one clamping portion.

This also takes account of the hygienic design, but the number of sealing elements can be minimized here, as they are only required at a few points on the clamping device.

Further preferably, the clamping device is adapted to clamp tubular, polygonal or elliptical clamping parts. The clamping sections can take a variable shape here, which means that these can be manufactured in many different embodiments and are thus adaptable to different external conditions.

Further preferably, the at least one bushing is connected to the connecting joint by a threaded connection.

The invention further includes a system comprising a clamping device and at least one clamping part which is tubular or has a polygonal or elliptical cross-section.

Further preferably, this system is used for aligning and fixing a camera or a display and control unit, for example in a plant of the food industry or food processing industry, preferably a scale or a multihead scale.

Due to the flexible adjustability of the clamping device, but at the same time its hygienic design, such clamping devices are very well suited for plants in the food industry or food processing industry.

BRIEF DESCRIPTION OF THE SEVERAL VIEWS OF THE DRAWINGS

In the following, preferred embodiments are explained in more detail with reference to the accompanying drawings.

DESCRIPTION OF SPECIFIC EMBODIMENTS OF THE INVENTION

Figure 1:
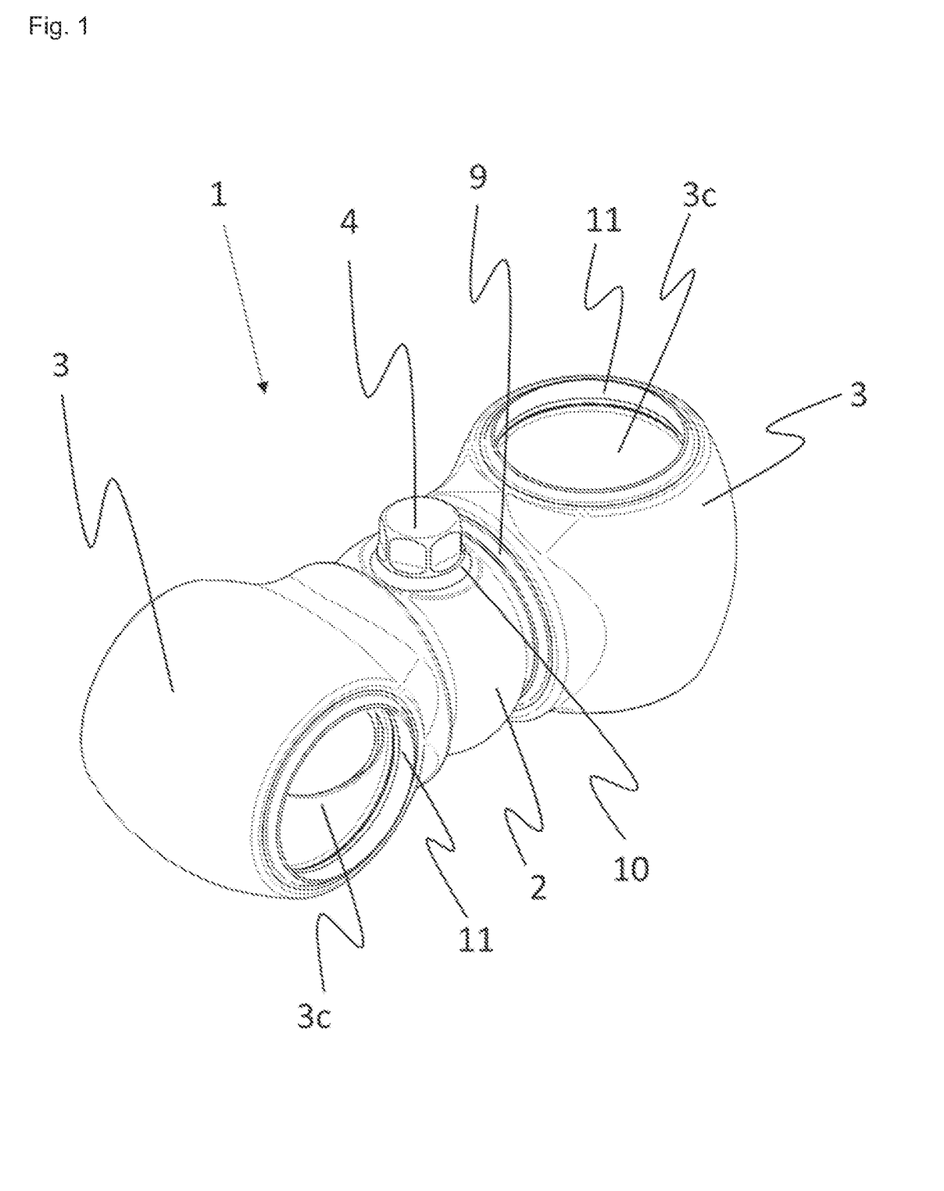
FIG. 1 is an isometric view of the clamping device according to the first embodiment of the present invention. Here, two clamping sections are arranged on a connecting joint.

FIG. 1 shows the clamping device 1 in an isometric view. Here, it becomes clear that one clamping section 3 is provided on a connecting joint 2 on each side. The clamping sections 3 each contain an opening 3c for inserting and clamping a clamping part K (not shown here). A first sealing element 9 is provided between the connecting joint and the clamping sections in each case. A second sealing element 11 is further provided at the upper and lower ends of this opening in each case. Furthermore, a tensioning element 4 is provided, here in the form of a screw, which is connected to the connecting joint. A sealing disc 10 is arranged under the head of the screw to prevent foreign matter (e.g. liquid or dust) from penetrating into the interior of the connecting joint 2. The clamping device 1 is provided here in a very compact manner, which results in space-saving use.

Figure 2:
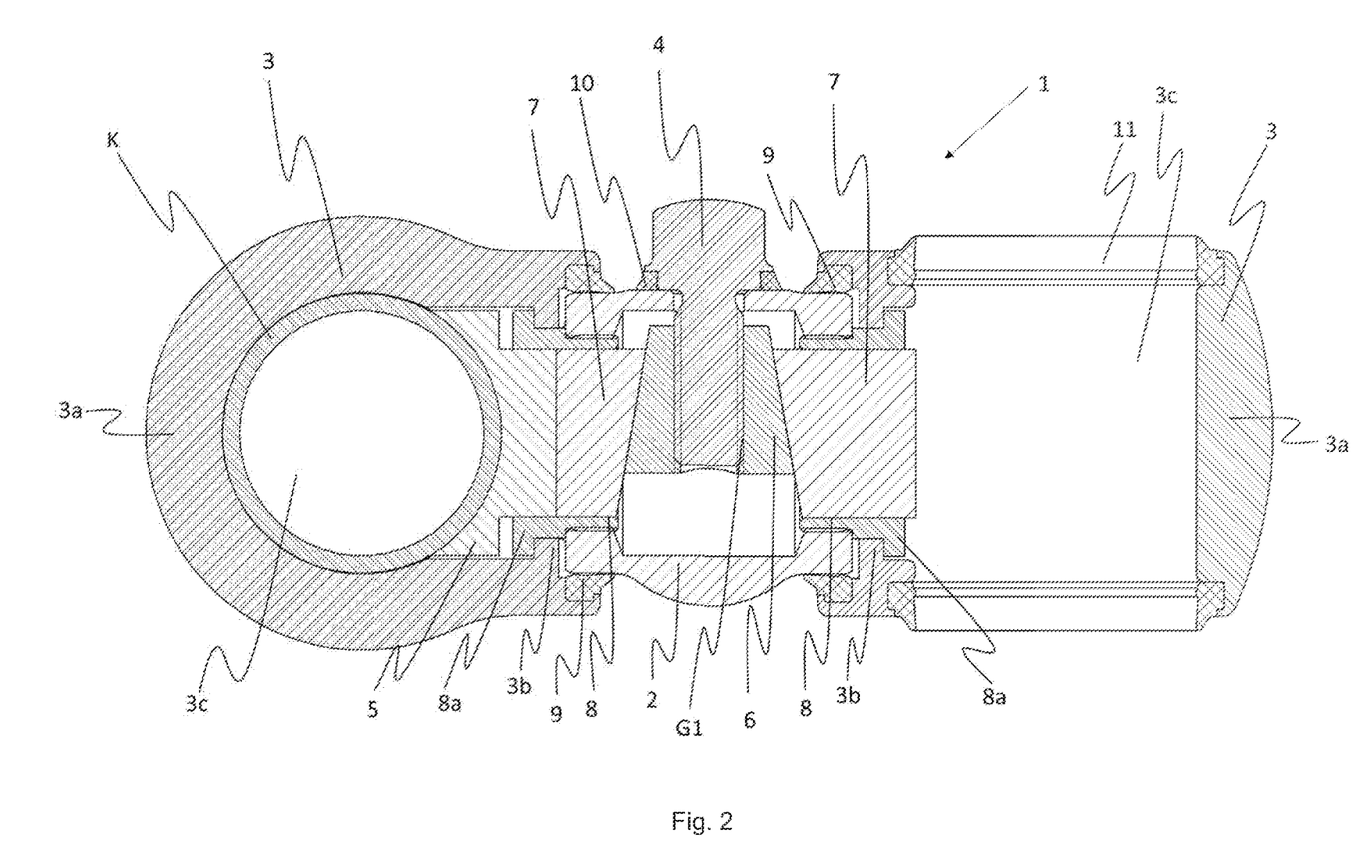
FIG. 2 is a sectional view (longitudinally cut) of a clamping device according to the first embodiment of the present invention, wherein here a clamping part is provided in the left clamping section and the clamping device is in the clamped state.

FIG. 2 shows a cross-sectional view of the clamping device 1, here a sectional view in the longitudinal direction. FIG. 2 shows a state in which the clamping device is in the clamped state, that is, in which a clamping part K is clamped. Again, the structure of the connecting joint 2 can be seen, and it can be seen that a clamping section 3 is provided here on the left and right sides of the connecting joint 2, respectively. This clamping section 3 has an annular projection 3b in each case. The outer end of the clamping sections is the end 3a facing away from the connecting joint 2. The clamping sections 3 each contain an opening 3c for inserting and clamping a clamping part K.

It can also be seen that the tensioning element 4 is arranged on a sealing disc 10, which is connected to the clamping element 6 in the connecting joint 2 by a thread G1. Thus, the clamping element 6 can be moved by rotating the tensioning element. Here, the clamping element 6 is trapezoidal in shape and has a certain amount of clearance within the connecting joint 2, so it can be moved up or down by rotating the tensioning element 4. The clamping element 6 has an inclined surface on both sides, each of which is in contact with and rests against another inclined surface of a respective transmission element 7. By moving the tensioning element 6 upwards or downwards, the two transmission elements 7 are each moved in the left-right direction here. A bushing 8 is provided on each of the side surfaces of the connecting joint, which is connected to the connecting joint by a thread. These bushings 8 each have a projection 8a. This projection 8a of the bushing 8 engages with the projection 3b of the respective clamping section 3.

A first sealing element 9 is provided between each of the clamping sections 3 and the connecting joint 2, which prevents foreign matter (e.g. liquid or dust) from entering the surfaces between the connecting joint 2 and the clamping sections 3.

The clamping jaws 5 can each be fitted in a corresponding recess in the clamping sections 3.

A second sealing element 11 is seated on the clamping sections 3 on each side of the opening 3c, which prevents foreign matter (e.g. liquid or dust) from entering the gap between clamping section 3 and clamping part K (not shown here).

The two transmission elements 7 are pressed outwards by the clamping element 6, which is why the clamping jaws 5 are also pressed outwards towards the end 3a of the clamping sections 3 facing away from the connecting joint 2. In the left clamping section 3, a clamping part K in the form of a tube is shown in this view. Here, it become clear that this clamping part K is pressed toward the end 3a of the left clamping section 3 facing away from the connecting joint 2. As a result, the left-hand clamping section 3 has also been displaced outwards, which is why the projection 3b of the left-hand clamping section 3 has been pressed outwards and thus now rests against the projection 8a of the bushings 8 in a frictional connection. Thus, there is no gap between the projection 3b of the left clamping section 3 and the projection 8a of the left bushing 8.

With regard to the right-hand clamping section 3, the same configuration can be seen, except that it is rotated by 90° and thus no cross-section is visible here. However, the second sealing elements 11 also can be seen here, which are provided at the openings of the clamping section 3.

Figure 3:
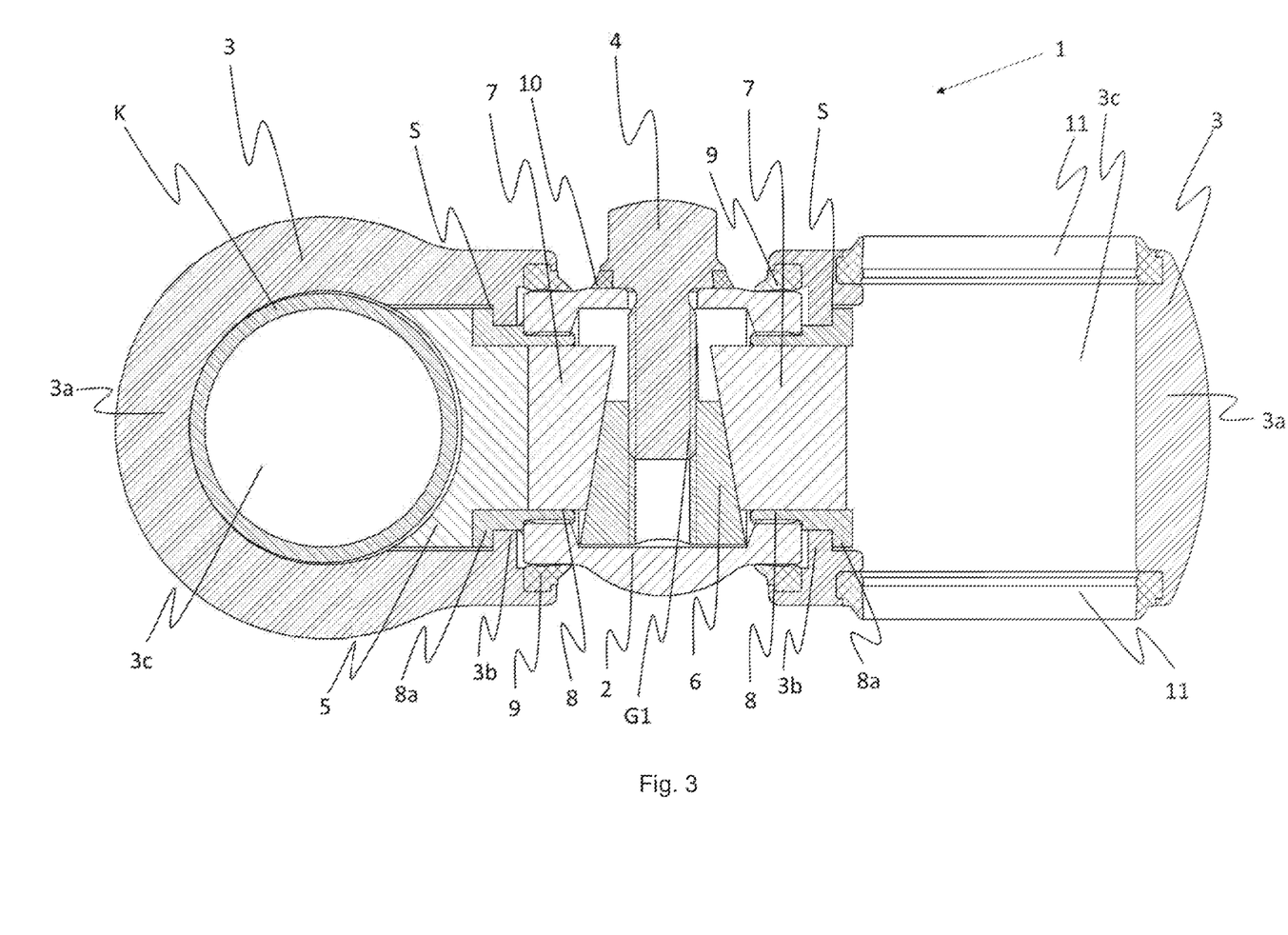
FIG. 3 also shows a sectional view (longitudinally cut) of a clamping device according to the first embodiment of the present invention, wherein a clamping part is provided in the left clamping section and the clamping device is in the relaxed state.

FIG. 3 shows basically the same longitudinal section, but in the relaxed state. Compared to FIG. 2, the clamping element 6 is clearly shifted downward here. This reduces the pressure on the connecting elements 7 and clamping jaws 5 so that they can move inward toward the connecting joint 2.

In the relaxed state, the clamping sections 3 are held on the connecting joint 2, so they cannot be removed or fall out, but at the same time a small gap S is provided between the projection 3b of the clamping section and the projection 8a of the bushing. The projection 3b of the clamping sections thus has a small amount of clearance between the connecting joint 2 as well as the respective projections 8a of the bushings 8. This allows the clamping sections 3 to be rotated relative to the connecting joint 2 as well as against each other in the relaxed state.

Figure 4:
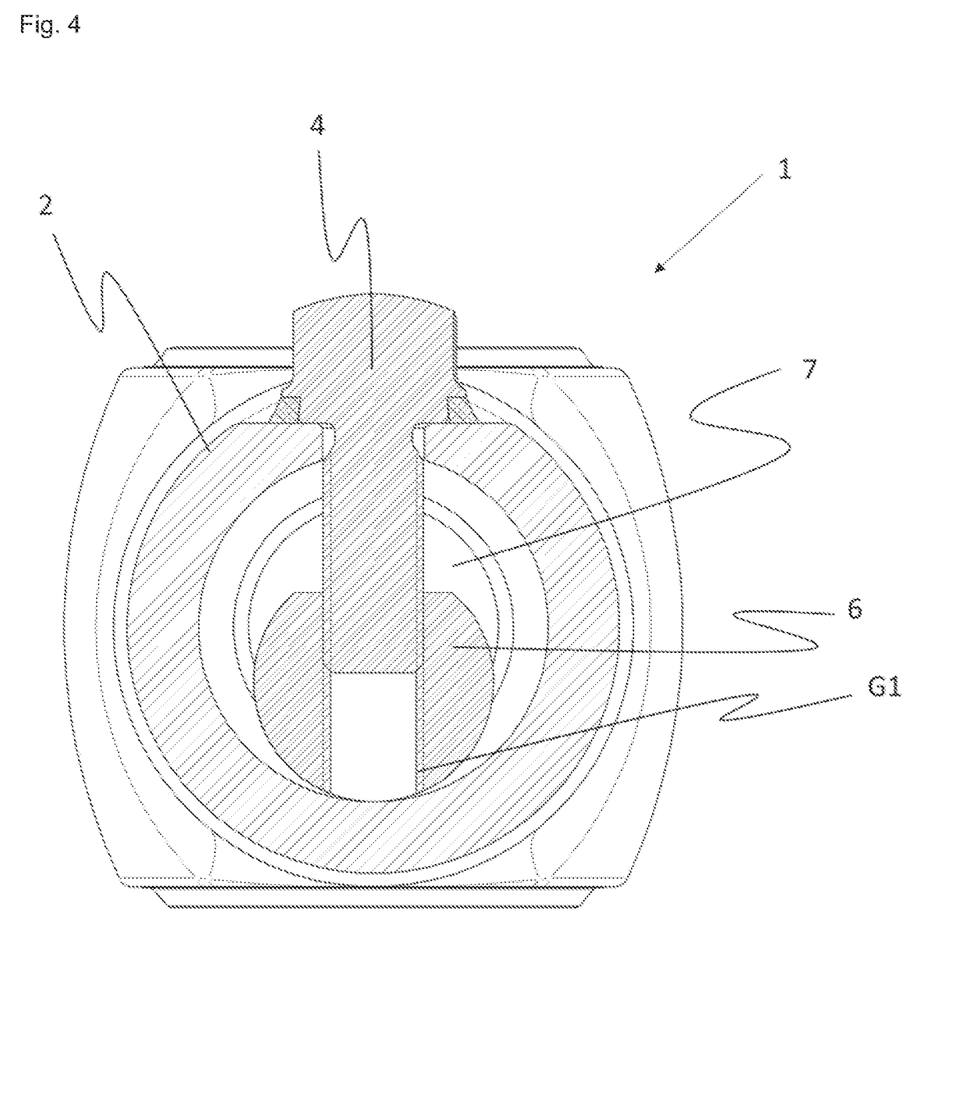
FIG. 4 shows a sectional view (transversely cut) of the clamping device according to the first embodiment of the present invention.

FIG. 4 also shows a sectional view of the clamping device 1, but here in cross-section through the center of the connecting joint. The arrangement of the tensioning element 4 in the connecting joint 2 can be seen here. The thread G1 between tensioning element 4 and tensioning element 6 can also be seen.

Thus, the clamping element 6 is connected to the tensioning element 4 via the thread G1. It can also be seen here that the clamping element 6 can still be moved upwards by moving the tensioning element 4. It is also apparent that the clamping element 6 rests against the transmission element 7 shown here at the front.

Figure 5:
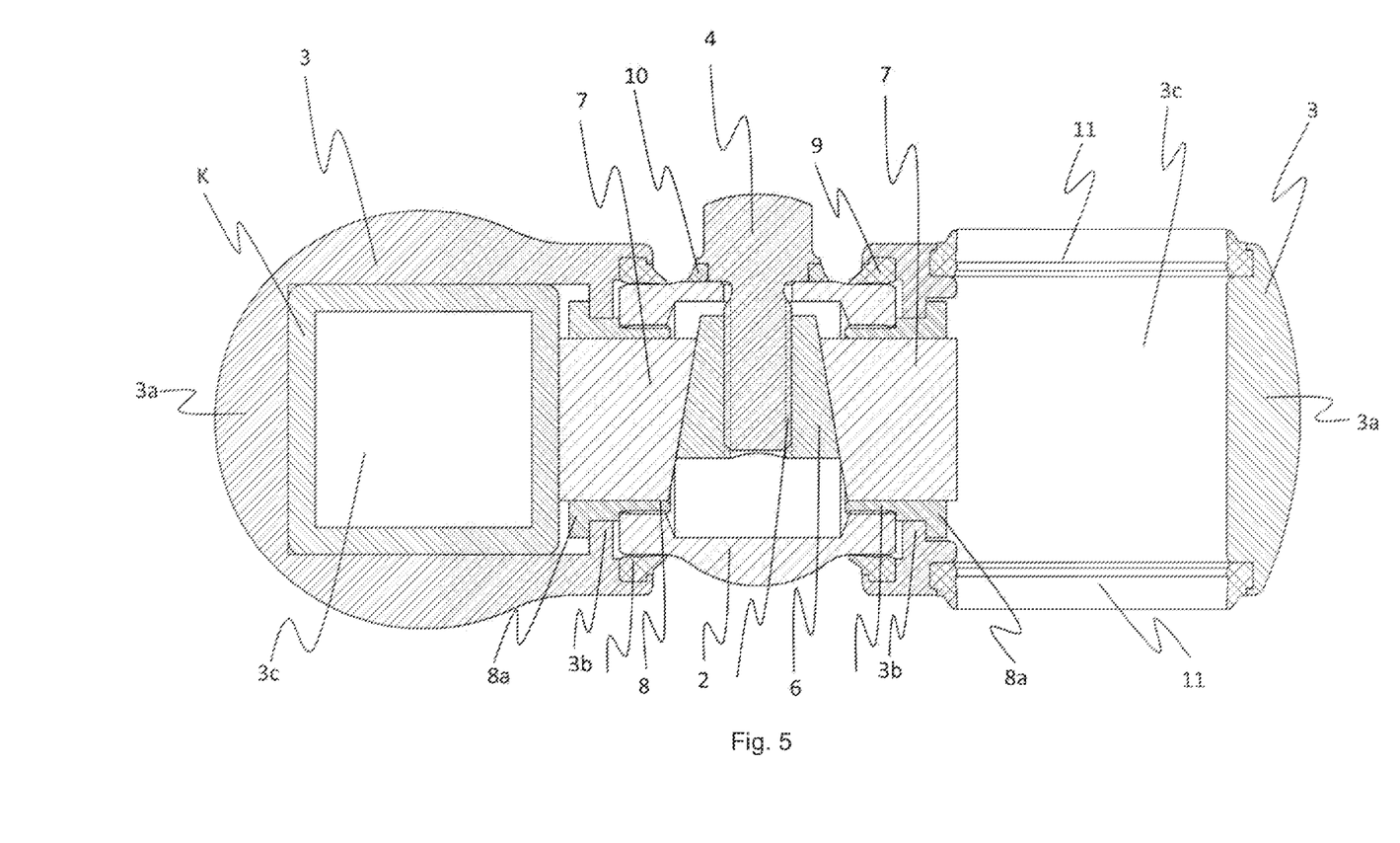
FIG. 5 shows a second embodiment of the present invention in sectional view (longitudinal section). This is adapted to clamp an angular clamping part.

FIG. 5 shows a second embodiment of the present invention in the clamped state (in longitudinal section). Here, instead of a round clamping part K, a square clamping part K is clamped in the clamping device 1. This embodiment corresponds essentially to FIG. 2, except that here the clamping part K is clamped directly by the transmission element 7—a separate clamping jaw, as shown in FIG. 2, is therefore not necessary here.

Figure 6:
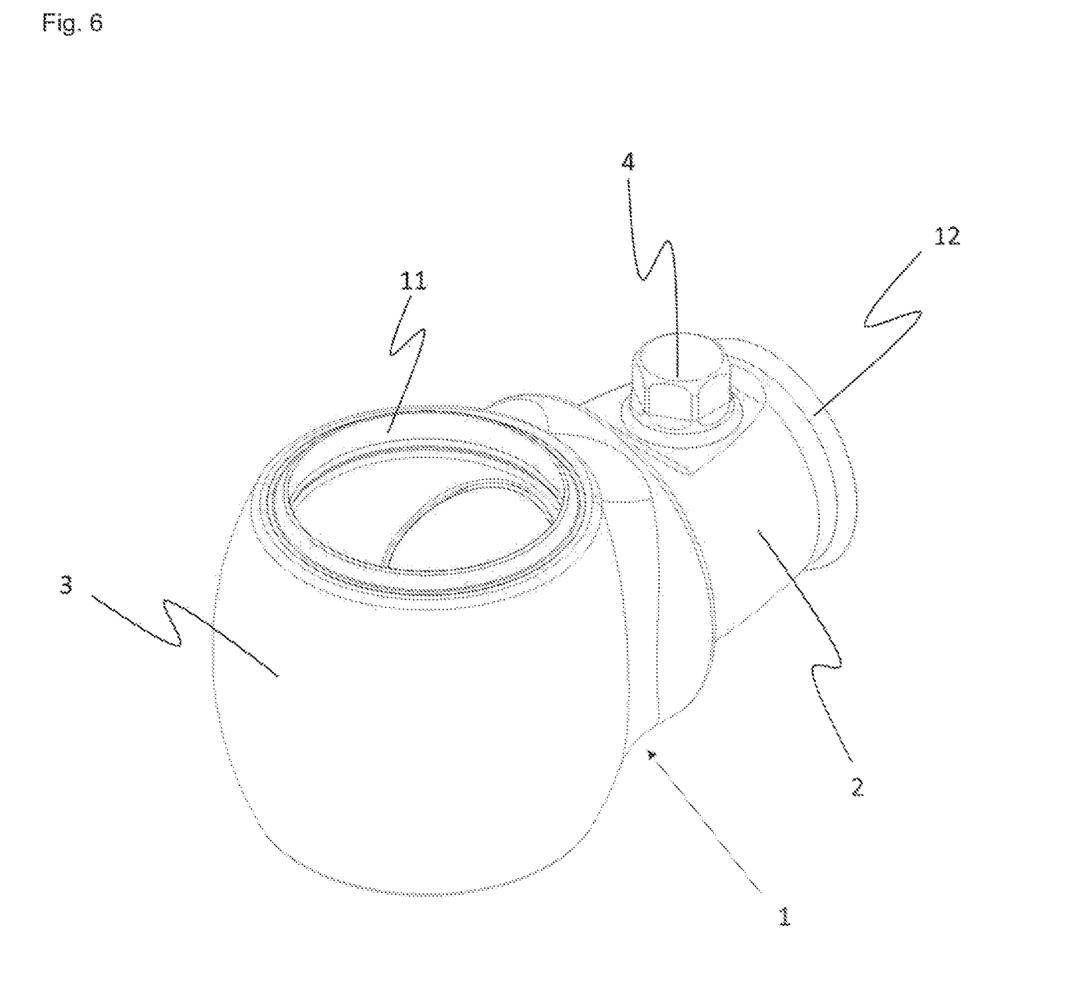
FIG. 6 shows a third embodiment of the present invention. Here, one clamping section is arranged on a connecting joint.

FIG. 6 shows a third embodiment of the present invention. Here, the clamping device 1 comprises only a clamping section 3 with corresponding second sealing elements 11. At the other end of the connecting joint 2, a flange (not shown here) with a sealing disc 12 is attached, with which the clamping device can be attached to a plane, for example. Also a tensioning element 4 is present, in the present embodiment also in the form of a screw, by means of which both the tensioning and the rotatability of the one clamping section 3 can be controlled.

Figure 7:
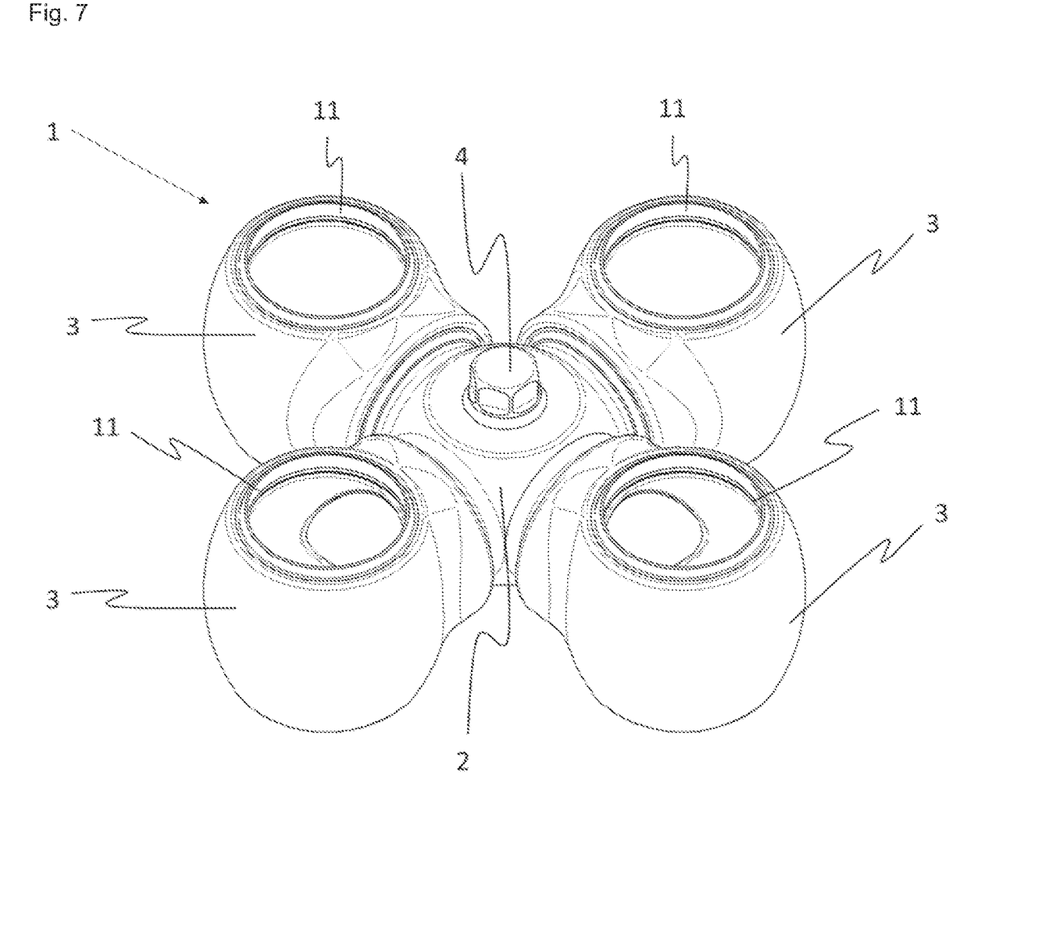
FIG. 7 shows a fourth embodiment of the present invention in isometric view. Here, four clamping sections are arranged on a connecting joint.

FIG. 7 shows a fourth embodiment of the present invention, namely a clamping device 1 with four clamping sections 3 with corresponding second sealing elements 11 is shown here. Here, four clamping sections 3 are arranged on a connecting joint. Furthermore, a tensioning element 4 in the form of a screw is arranged on the connecting joint 2, by means of which both the tensioning and the rotatability of all four clamping sections 3 can be controlled.

Figure 8:
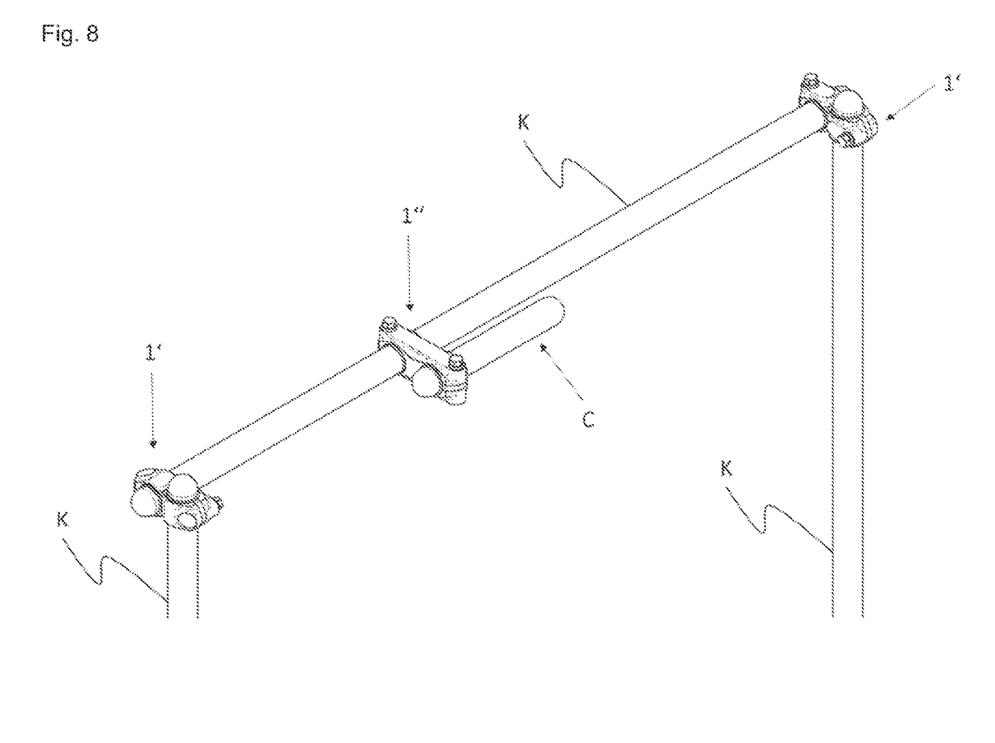
FIG. 8 shows an attachment and fixation of a camera according to an embodiment of the prior art.

FIG. 8 shows a system for mounting a camera C according to the prior art. Here, two clamping parts K, K are respectively connected to each other at an angle of 90°. A camera C is also parallel to a clamping part K. The clamping device 1' according to the prior art is in each case capable of either connecting two clamping parts K in parallel or connecting them at a right angle of 90°. The particular clamping device 1" according to the prior art is adapted to arrange the camera C at an angle of 180°, i.e. parallel to a clamping part K.

Figure 9:
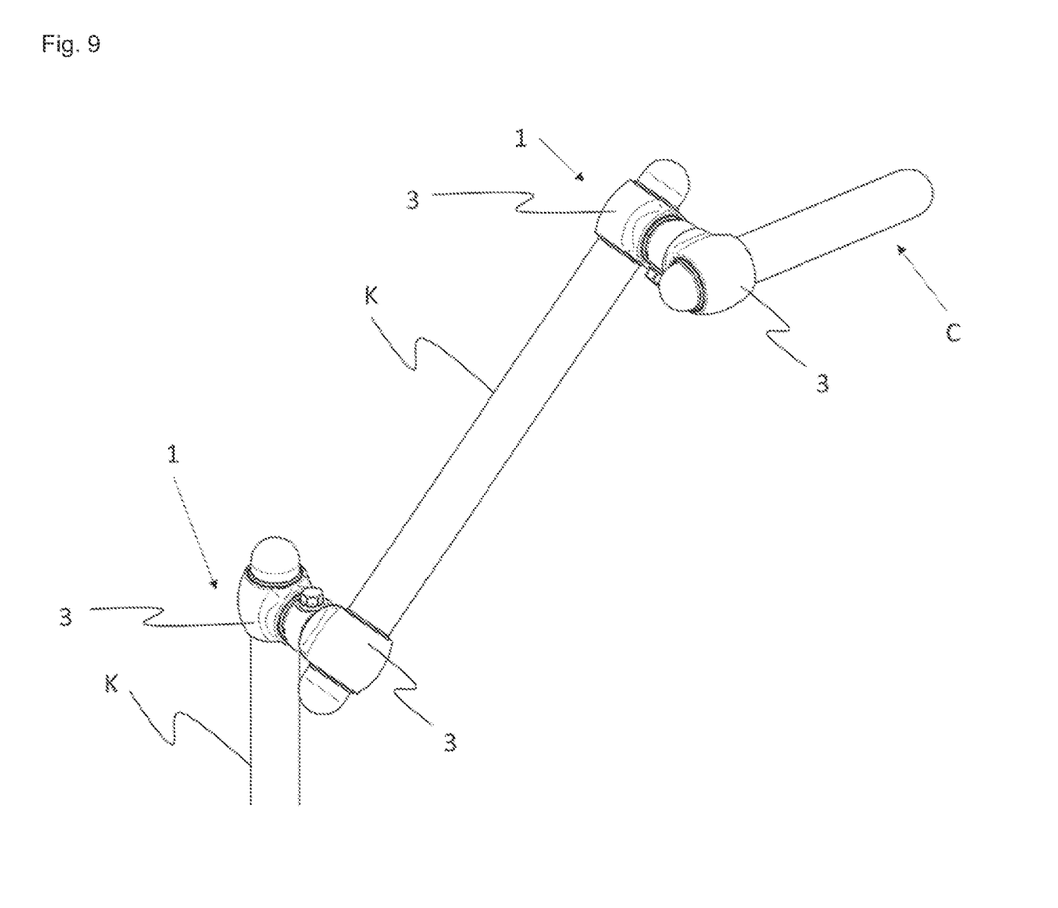
FIG. 9 shows the mounting and fixing of a camera with a clamping device according to the present invention.

FIG. 9 shows a form of application of the clamping device according to the first embodiment of the present invention, wherein various clamping parts K, in the present case rods, are clamped by a clamping device 1 here. A clamping device 1 can also be used for connecting a rod, i.e. a clamping part K, and a camera C. It can be clearly seen here that angles between two clamping parts K can be set very variably by rotating the clamping sections 3 here, so that every possible position of the camera C is possible.

Figure 10:
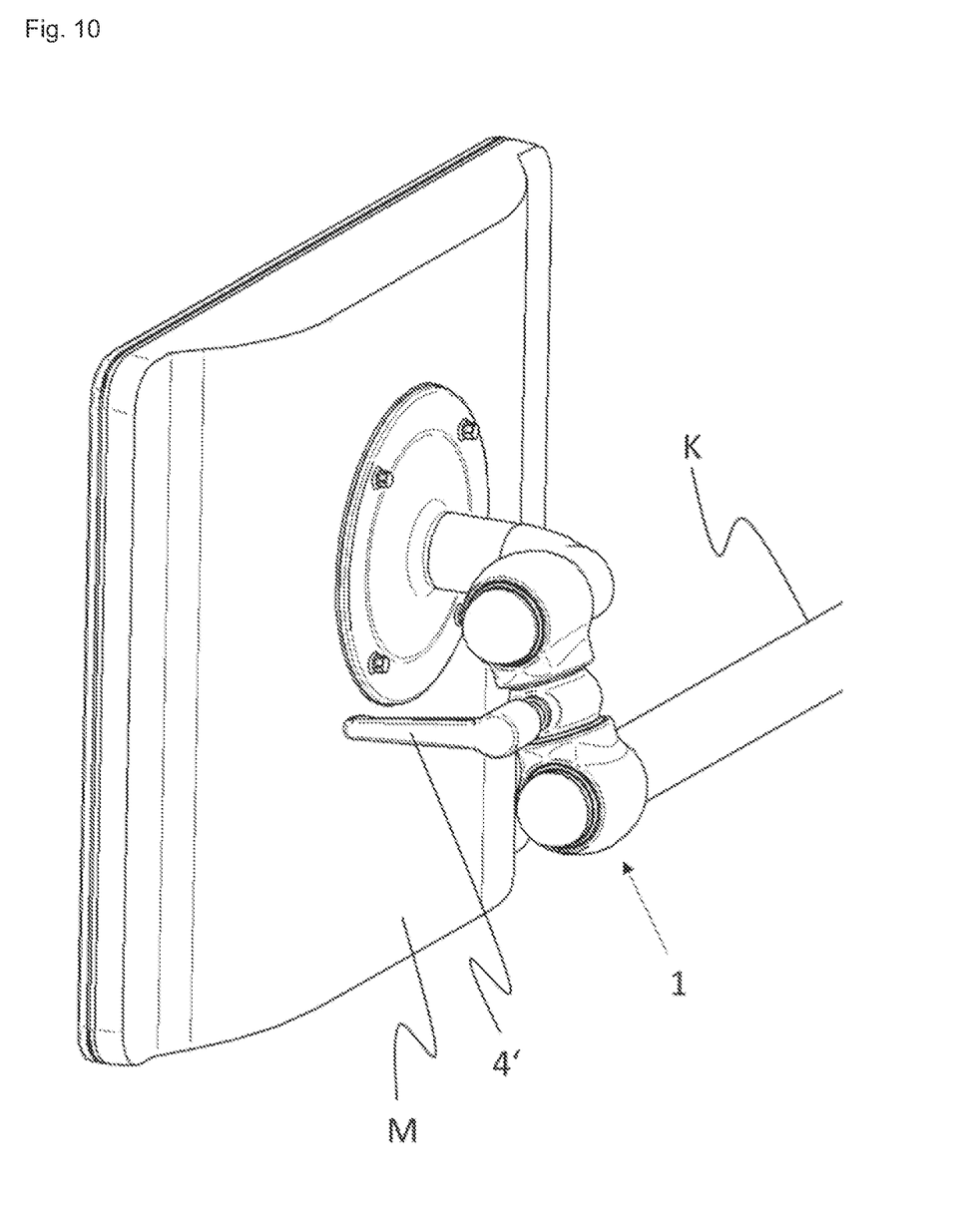
FIG. 10 shows the attachment of a monitor to a rod, an application of the clamping device according to the present invention.

FIG. 10 shows a further application form of the clamping device 1 according to the first embodiment of the present invention. Here, a display and operating unit M is connected to a clamping part K by means of the clamping device 1. Instead of a screw, an alternative tensioning element 4' is provided here, in this case a lever. This can also be used to select an open and closed position on the clamping device 1. In the open position, movement of the clamping parts K in the clamping device is possible and, furthermore, the angle between the two clamping parts K can be variably adjusted. In the closed position, neither the angles nor the position of the clamping parts can be changed.

The present invention is not limited to the embodiments shown above.

For example, it would be possible to design the tensioning element 4 as a hydraulic device so that the movement of the clamping element 6 is controlled depending on an oil pressure within the connecting joint 2.

Furthermore, it would also be possible to provide a gearwheel combination with a corresponding actuating mechanism as tensioning element 4 instead of a screw.

The clamping element 6 could also be designed as a truncated pyramid. However, this would have disadvantages during assembly. It would also be possible, for example, to install a plastically deformable part instead of the clamping element 6, which would press the transmission elements 7 outward by squeezing. An eccentric would also be possible as a clamping element.

The present invention includes a clamping device 1 for connecting clamping parts K, wherein, by movement of a single tensioning element 4, both at least one clamping section 3 can be rotated relative to a connecting joint 2, or two clamping sections 3 can be rotated relative to one another, and, by clamping at least one clamping jaw 5, the clamping parts K can be clamped in the at least one clamping section 3. Thus, by moving a single tensioning element 4, both clamping and fixing and releasing rotation of the at least one clamping section is possible. This clamping device 1 is easy to handle, highly variable, and also takes into account the regulations of hygienic design, since no gaps, cavities or threads are exposed here in which dirt could accumulate.

What is claimed is:

1. A clamping device for connecting and clamping clamping parts, comprising:
    a connecting joint, at least one clamping section with respective transmission element, and a tensioning element, wherein the tensioning element is arranged on the connecting joint and is in a tensioned state in a first end position, and is in a relaxed state in a second end position, wherein, in the clamped state, the at least one transmission element presses against a respective clamping part, whereby the clamping part is clamped between a respective clamping section and a transmission element and is thus fixed, and in the relaxed state a clamping part is movable in a clamping section, wherein the at least one clamping section is rotatable relative to the connecting joint in the relaxed state and is fixed to the connecting joint in the tensioned state, wherein a clamping element is provided in the connecting joint, wherein the clamping element has an inclined surface on at least one side, each of which abuts an inclined surface of at least one transmission element, so that a translational movement of the clamping element causes a translational movement of the at least one transmission element, wherein the translational movement of the clamping element has a different direction than the translational movement of the at least one transmission element.

2. The clamping device according to claim 1, wherein in the clamped state the at least one transmission element is displaced in the direction of an end of the clamping section facing away from the connecting joint, so that a clamping part presses against the end of the clamping section facing away from the connecting joint, as a result of which clamping parts clamped in the clamping section can be fixed, and in the relaxed state the at least one transmission element is displaced in the direction of the connecting joint, whereby a clamping part is movable in the clamping section.

3. The clamping device according to claim 1, wherein the direction of the translational movement of the clamping element is perpendicular to the direction of the translational movement of the at least one transmission element.

4. The clamping device according to claim 1, wherein the tensioning element is a screw and is connected inside the connecting joint to the clamping element by a thread, and the clamping element is movable along the thread by turning the screw.

5. The clamping device according to claim 1, wherein a bushing is provided on the connecting joint on at least one side, which bushing has a projection arranged in an annular shape, and wherein the at least one clamping section has a projection which engages with the projection of the bushing, so that the at least one clamping section is rotatable around the connecting joint in the relaxed state.

6. The clamping device according to claim 1, wherein, in the relaxed state, a projection of the at least one clamping section is positioned with clearance respectively between the connecting joint and a projection of at least one bushing and is thus rotatable relative to the connecting joint, and, in the clamped state, the projection of the at least one clamping section is pressed against the projection of the at least one bushing, so that the at least one clamping section is fixed to the projection of the at least one bushing by a frictional connection and cannot be rotated relative to the connecting joint.

7. The clamping device according to claim 1, wherein a respective clamping jaw is mounted on the at least one transmission element, each adapted to abut at least partially against a peripheral surface of a clamping part.

8. The clamping device according to claim 4, wherein a first sealing element is provided under a head of the screw.

9. The clamping device according to claim 1, wherein a first sealing element is provided between the at least one clamping section and the connecting joint, and/or second sealing elements are provided at openings of the at least one clamping section, which are adapted to adapt to a outer surface of the clamping parts.

10. The clamping device according to claim 1, adapted to clamp tubular, polygonal or elliptical clamping parts.

11. The clamping device according to claim 4, wherein a bushing is positively connected to the connecting joint, preferably with a thread or barb.

12. The clamping device according to claim 1, wherein two clamping sections with respective clamping jaws are provided on the connecting joint, and in the relaxed state; wherein projections of the clamping sections are positioned with clearance respectively between the connecting joint and projections of bushings and are rotatable relative to one another, and, in the clamped state, the projections of the clamping sections are pressed against the projections of the bushings, so that the clamping sections are fixed to the projections of the bushings by a respective frictional connection and cannot be rotated relative to one another.

13. A system comprising the clamping device according to claim 1 and at least one clamping part which is tubular or has a polygonal or elliptical cross-section.

\* \* \* \* \*